(12) United States Patent
Huang

(10) Patent No.: US 7,825,535 B2
(45) Date of Patent: Nov. 2, 2010

(54) SELF-COUPLED TRANSFORMER BOOSTBUCK CIRCUIT

(75) Inventor: Ming-Ho Huang, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 122 days.

(21) Appl. No.: 12/271,536

(22) Filed: Nov. 14, 2008

(65) Prior Publication Data

US 2009/0160250 A1   Jun. 25, 2009

(30) Foreign Application Priority Data

Nov. 15, 2007  (TW) .............................. 096219276

(51) Int. Cl.
*H02J 1/00* (2006.01)
*H02M 3/335* (2006.01)

(52) U.S. Cl. ............................ 307/17; 363/16; 363/20; 363/21.01; 363/21.04

(58) Field of Classification Search ................... 307/17; 363/16, 20, 21.01, 20.04
See application file for complete search history.

(56) References Cited

U.S. PATENT DOCUMENTS

| 3,349,311 A * | 10/1967 | Dudley | 363/18 |
| 2005/0207180 A1 * | 9/2005 | Pansier | 363/16 |

* cited by examiner

*Primary Examiner*—Jared J Fureman
*Assistant Examiner*—Hal I Kaplan
(74) *Attorney, Agent, or Firm*—Muncy, Geissler, Olds & Lowe, PLLC

(57) ABSTRACT

A self-coupled transformer boostbuck circuit includes a first transformer having a first winding, a second winding and a third winding, a first switch having a first voltage output at its one end, a second switch, a second transformer, a third switch having a second voltage output at its one end, a fourth switch, a fifth switch having a third voltage output at its one end, and a sixth switch.

12 Claims, 2 Drawing Sheets

SELF-COUPLED TRANSFORMER BOOSTBUCK CIRCUIT

BACKGROUND OF THE INVENTION

1. Field of the Invention

The present invention relates generally to a boostbuck circuit and more particularly, to a self-coupled transformer boostbuck circuit that provides multiple voltage outputs.

2. Description of the Related Art

In a regular LLC resonant converter, the secondary wide has +12V, +5V and +3.3V voltage outputs drawn from the middle part. However, when the load at one voltage output of the LLC resonant converter is changed, the other voltage output will be affected to cause cross regulation. For example, when the load at the +12V output is changed, the voltage outputs +5V and +3.3V will be relatively changed; when the load at the +5V is changed, the voltage outputs +12V and +3.3V will be relatively changed. Thus, these three voltage outputs affect one another, causing a cross regulation error.

Therefore, it is desirable to provide a boostbuck circuit that eliminates the aforesaid problem.

SUMMARY OF THE INVENTION

The present invention has been accomplished under the circumstances in view. It is one object of the present invention to provide a self-coupled transformer boostbuck circuit that provides multiple voltage outputs.

It is another object of the present invention to provide a self-coupled transformer boostbuck circuit that uses a self-coupled transformer to execute voltage boosting and dropping, providing multiple voltage outputs.

To achieve these and other objects, the self-coupled transformer boostbuck circuit of the first embodiment of the present invention comprises a first transformer, the first transformer having a primary side and a secondary side, the primary side comprising a first winding, the secondary side comprising a second winding and a third winding, the second winding and the third winding being connected in series, the connection between the second winding and the third winding being connected to ground potential, the first winding having one end coupled to the output terminal of the LLC converter; a first switch, the first switch having one end coupled to one end of the second winding that has an opposite end providing with an opposite end of the first switch a first voltage output (V1); a second switch, the second switch having one end coupled to one end of the third winding opposite to the second winding and an opposite end coupled to one end of the first switch opposite to the second winding; a second transformer, the second transformer comprising a first winding, a second winding, a third winding, a fourth winding, a fifth winding and a sixth winding that are connected in series, the first winding of the second transformer having one end coupled to the second winding of the first transformer, the sixth winding of the second transformer having an opposite end coupled to one end of the third winding opposite to the second winding, the connection between the third winding and fourth winding of the second transformer being connected to ground potential; a third switch, the third switch having one end coupled to the connection between the first winding and second winding of the second transformer and an opposite end providing a second voltage output (V2); a fourth switch, the fourth switch having one end coupled to the connection between the second winding and third winding of the second transformer; a fifth switch, the fifth switch having one end coupled to the connection between the fourth winding and fifth winding of the second transformer and an opposite end coupled to an opposite end of the fourth switch and providing a third voltage output (V3); and a sixth switch, the sixth switch having one end coupled to the connection between the fifth winding and sixth winding of the second transformer and an opposite end connected to the second voltage output end of the third switch such that the second voltage output and the third voltage output are not affected by variation of the first voltage output.

To achieve these and other objects, the self-coupled transformer boostbuck circuit of the second embodiment of the present invention comprises a first transformer, the first transformer having a primary side and a secondary side, the primary side comprising a first winding, the secondary side comprising a second winding, a third winding, a fourth winding and a fifth winding, the second winding and the third winding and the fourth winding and the fifth winding being connected in series, the first winding having one end coupled to the output terminal of the LLC converter; a second transformer, the second transformer comprising a first winding, a second winding, a third winding, a fourth winding, a fifth winding and a sixth winding, the first winding of the second transformer having one end coupled to the second winding of the first transformer, the sixth winding of the second transformer having one end coupled to an opposite end of the fifth winding of the first transformer, the connection between the third winding and fourth winding of the second transformer being connected to ground potential; a first switch, the first switch having one end coupled to the first winding of the second transformer and an opposite end providing a first voltage output (V1); a second switch, the second switch having one end coupled to one end of the second winding of the second transformer and the second winding of the first transformer and an opposite end providing a second voltage output (V2); a third switch, the third switch having one end coupled to the connection between the second winding and third winding of the second transformer and an opposite end providing a third voltage output (V3); a fourth switch, the fourth switch having one end coupled to the connection between the fourth winding and fifth winding of the second transformer and an opposite end connected to an opposite end of the third switch; a fifth switch, the fifth switch having one end coupled to an opposite end of the fifth winding of the second transformer and the connection between the fourth winding and fifth winding of the first transformer and an opposite end coupled to an opposite end of the second switch; and a sixth switch, the sixth switch having one end coupled to an opposite end of the sixth winding of the second transformer and an opposite end coupled to an opposite end of the first switch such that the second voltage output and the third voltage output are not affected by variation of the first voltage output.

DETAILED DESCRIPTION OF THE INVENTION

Figure 1:
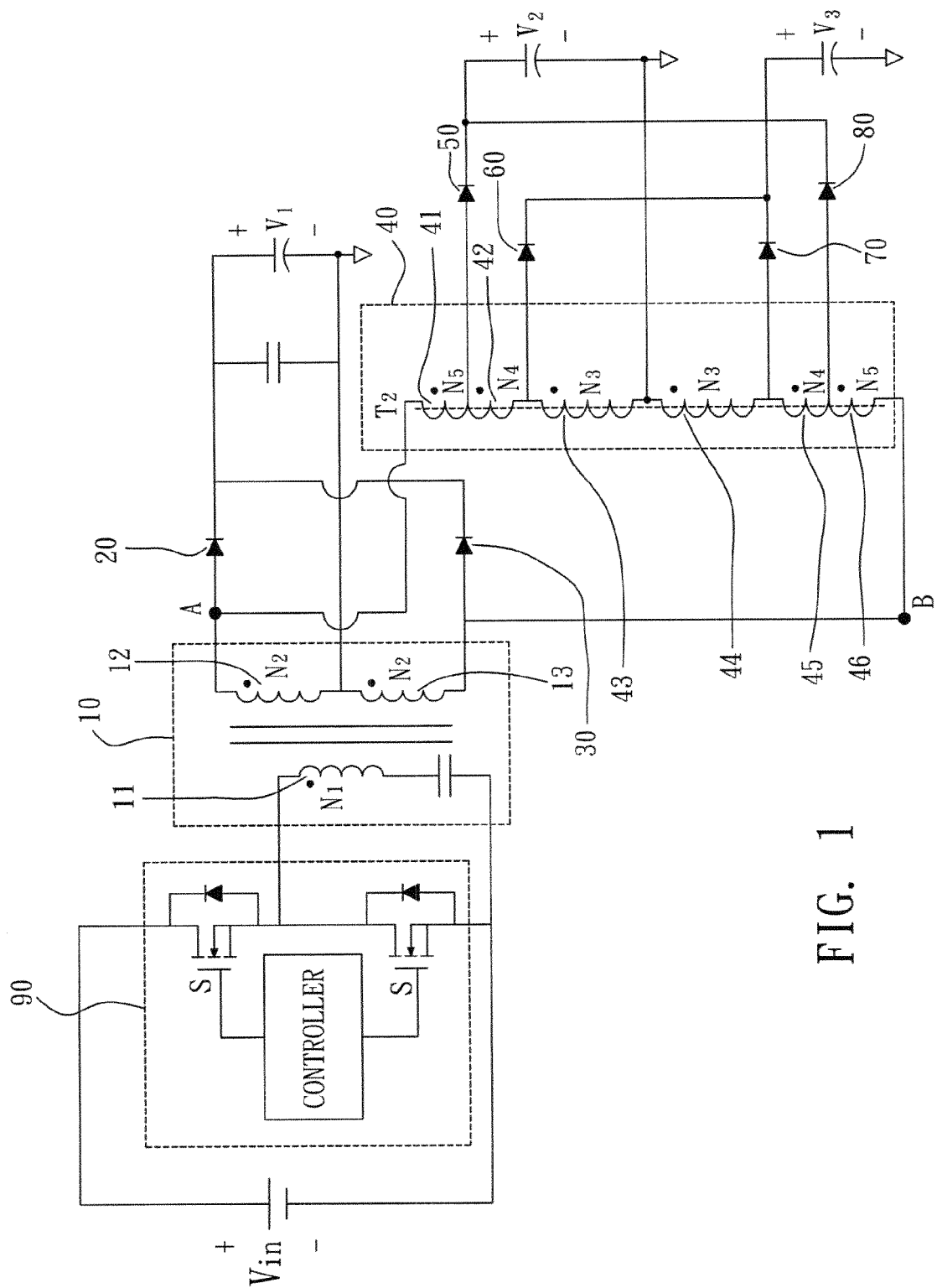
FIG. 1 is a circuit block diagram of a self-coupled transformer boostbuck circuit in accordance with a first embodiment of the present invention.

FIG. 1 is a circuit block diagram of a self-coupled transformer boostbuck circuit in accordance with a first embodiment of the present invention. As illustrated, the self-coupled transformer boostbuck circuit comprises a first transformer 10, a first switch 20, a second switch 30, a second transformer 40, a third switch 50, a fourth switch 60, a fifth switch 70, and a sixth switch 80.

The first transformer 10 has a primary side and a secondary side. The primary side comprises a first winding 11. The secondary side comprises a second winding 12 and a third winding 13. The second winding 12 and the third winding 13 are connected in series. The connection between the second winding 12 and the third winding 13 is connected to ground potential (GND). The first winding 11 has one end coupled to the output terminal of a LLC resonant converter 90. The LLC resonant converter 90 is a known AC/DC converter, no further detailed description is necessary in this regard. The first transformer 10 can be, but not limited to, a flyback transformer. The flyback transformer is of the known design, no further detailed description is necessary in this regard. Further, the first winding 11 of the first transformer 10 has a number of turns N1; the second winding 12 and third winding 13 of the first transformer 10 have a same number of turns N2.

The first switch 20 has one end coupled to one end of the second winding 12. A first voltage output V1 is provided between the other end of the second winding 12 and the other end of the first switch 20. The first switch 20 can be, but not limited to a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The second switch 30 has one end coupled to the other end of the third winding 13, and the other end coupled to the other end of the first switch 20. The second switch 30 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The second transformer 40 comprises a first winding 41, a second winding 42, a third winding 43, a fourth winding 44, a fifth winding 45, and a sixth winding 46 that are connected in series. The first winding 41 has one end coupled to the second winding 12 of the first transformer 10. The other end of the sixth winding 46 is coupled to the other end of the third winding 13 of the first transformer 10. The connection between the third winding 43 and the fourth winding 44 is connected to ground potential. The second transformer 40 can be, but not limited to, a self-coupled transformer. The first winding 41 and sixth winding 46 of the second transformer 40 have a same number of turns N5. The second winding 42 and fifth winding 45 of the second transformer 40 have a same number of turns N4. The third winding 43 and fourth winding 44 of the second transformer 40 have a same number of turns N3.

The third switch 50 has one end coupled to the connection between the first winding 41 and second winding 42 of the second transformer 40, and the other end providing a second voltage output V2. The third switch 50 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The fourth switch 60 has one end coupled to the connection between the second winding 42 and third winding 43 of the second transformer 40. The fourth switch 60 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The fifth switch 70 has one end coupled to the connection between the fourth winding 44 and fifth winding 45 of the second transformer 40, and the other end coupled to the other end of the fourth switch 60 and providing a third voltage output V3. The fifth switch 70 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The sixth switch 80 has one end coupled to the connection between the fifth winding 45 and sixth winding 46 of the second transformer 40, and the other end coupled to the other end of the third switch 50. The sixth switch 80 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

After shunt by ratio of winding of the related windings, the second voltage V2 is obtained subject to the equation:

$$V2 = \frac{N3 + N4}{N3 + N4 + N5} \times V1.$$

Therefore, by means of accurately controlling the number of turns N3 of the third winding 43 and fourth winding 44 of the second transformer 40, the number of turns N4 of the second winding 42 and fifth winding 45 of the second transformer 40 and the number of turns N5 of the first winding 41 and sixth winding 46 of the second transformer 40, the desired stable second voltage V2 is obtained, preventing the aforesaid cross regulation problem.

After shunt by ratio of winding of the related windings, the third voltage V3 is obtained subject to the equation:

$$V3 = \frac{N3}{N3 + N4 + N5} \times V1.$$

Therefore, by means of accurately controlling the number of turns N3 of the third winding 43 and fourth winding 44 of the second transformer 40, the number of turns N4 of the second winding 42 and fifth winding 45 of the second transformer 40 and the number of turns N5 of the first winding 41 and sixth winding 46 of the second transformer 40, the desired stable third voltage V3 is obtained, preventing the aforesaid cross regulation problem. Therefore, the self-coupled transformer boostbuck circuit is superior to the technique conventional LLC resonant converter.

Figure 2:
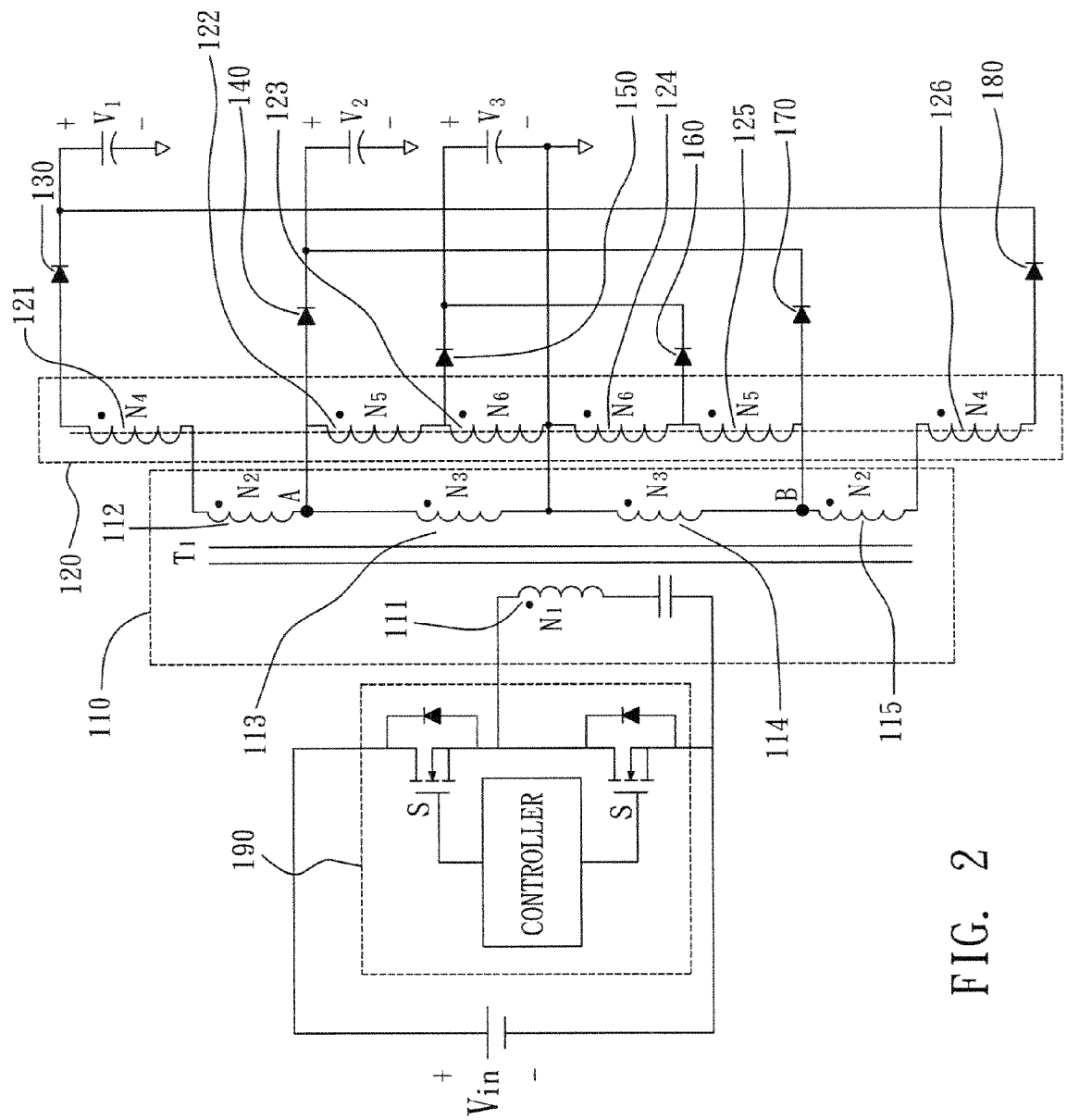
FIG. 2 is a circuit block diagram of a self-coupled transformer boostbuck circuit in accordance with a second embodiment of the present invention.

FIG. 2 is a circuit block diagram of a self-coupled transformer boostbuck circuit in accordance with a second embodiment of the present invention. As illustrated, the self-coupled transformer boostbuck circuit is used in a LLC resonant converter, comprising a first transformer 110, a second transformer 120, a first switch 130, a second switch 140, a third switch 150, a fourth switch 160, a fifth switch 170, and a sixth switch 180.

The first transformer 110 has a primary side and a secondary side. The primary side comprises a first winding 111. The secondary side comprises a second winding 112 and a third winding 113, a fourth winding 114, and a fifth winding 115. The second winding 112, the third winding 113, the fourth winding 114 and the fifth winding 115 are connected in series. The first winding 111 has one end coupled to the output terminal of the LLC resonant converter 190. The LLC resonant converter 190 is a known AC/DC converter, no further detailed description is necessary in this regard. The first transformer 110 can be, but not limited to, a flyback transformer. The flyback transformer is of the known design, no further detailed description is necessary in this regard. Further, the first winding 111 of the first transformer 110 has a number of turns N1; the second winding 112 and fifth winding 115 of the first transformer 110 have a same number of turns N2; the third winding 113 and the fourth winding 114 of the first transformer 110 have a same number of turns N3.

The second transformer 120 comprises a first winding 121, a second winding 122, a third winding 123, a fourth winding 124, a fifth winding 125, and a sixth winding 126. The first winding 121 has one end coupled to the second winding 112 of the first transformer 110. The sixth winding 126 has one end coupled to the other end of the fifth winding 115 of the first transformer 110. The connection between the third winding 123 and the fourth winding 124 is connected to ground potential. The second transformer 120 can be, but not limited to, a self-coupled transformer. The first winding 121 and sixth winding 126 of the second transformer 120 have a same number of turns N4. The second winding 122 and fifth winding 125 of the second transformer 120 have a same number of turns N5. The third winding 123 and fourth winding 124 of the second transformer 120 have a same number of turns N6.

The first switch 130 has one end coupled to the other end of the first winding 121, and the other end providing a first voltage output V1. The first switch 130 can be, but not limited to a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The second switch 140 has one end coupled to the other end of the second winding 122 of the second transformer 120 and the other end of the second winding 112 of the first transformer 110, and the other end providing a second voltage output V2. The second switch 140 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The third switch 150 has one end coupled to the connection between the second winding 122 and third winding 123 of the second transformer 120, and the other end providing a third voltage output V3. The third switch 150 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The fourth switch 160 has one end coupled to the connection between the fourth winding 124 and fifth winding 125 of the second transformer 120, and the other end coupled to the other end of the third switch 150. The fourth switch 160 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The fifth switch 170 has one end coupled to the other end of the fifth winding 125 of the second transformer 120 and the connection between the fourth winding 114 and fifth winding 115 of the first transformer 110, and the other end coupled to the other end of the second switch 140. The fifth switch 170 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

The sixth switch 180 has one end coupled to the other end of the sixth winding 126 of the second transformer 120, and the other end coupled to the other end of the first switch 130. The sixth switch 180 can be, but not limited to, a rectifier or power switch for synchronous rectification. In case of a power switch, it can be a N-pass MOSFET (metal-oxide semiconductor field-effect) transistor, N-pass junction field-effect transistor, P-pass MOSFET transistor or P-pass junction field-effect transistor for the advantage of low cost.

After shunt by ratio of winding of the related windings, the first voltage V1 is obtained subject to the equation:

$$V1 = \left(\frac{N4}{N5+N6} + \frac{N2+N3}{N3}\right) \times V2.$$

Therefore, by means of accurately controlling the number of turns N2 of the second winding 112 and fifth winding 115 of the first transformer 110, the number of turns N3 of the third winding 113 and fourth winding 114 of the first transformer 110 and the number of turns N4 of the first winding 121 and sixth winding 126 of the second transformer 120, the number of turns N5 of the second winding 122 and fifth winding 125 of the second transformer 120 and the number of turns N6 of the third winding 123 and fourth winding 124 of the second transformer 120, the desired stable first voltage V1 is obtained, preventing the aforesaid cross regulation problem.

After shunt by ratio of winding of the related windings, the third voltage V3 is obtained subject to the equation:

$$V3 = \frac{N6}{N5+N6} \times V2.$$

Therefore, by means of accurately controlling the number of turns N5 of the second winding 122 and fifth winding 125 of the second transformer 120 and the number of turns N6 of the third winding 123 and fourth winding 124 of the second transformer 120, the desired stable third voltage V3 is obtained, preventing the aforesaid cross regulation problem.

By means of the application of the self-coupled transformer boostbuck circuit to boost and drop the voltage, multiple voltage outputs are provided without cross regulation, eliminating the drawbacks of conventional LLC resonant converter.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A self-coupled transformer boostbuck circuit used in a LLC converter, comprising:
a first transformer, said first transformer having a primary side and a secondary side said primary side comprising a first winding, said secondary side comprising a second winding and a third winding, said second winding and said third winding being connected in series, the connection between said second winding and said third winding being connected to ground potential, said first winding having one end coupled to the output terminal of said LLC converter;
a first switch said first switch having one end coupled to one end of said second winding that has an opposite end providing with an opposite end of said first switch a first voltage output (V1);
a second switch, said second switch having one end coupled to one end of said third winding opposite to said second winding and an opposite end coupled to one end of said first switch opposite to said second winding;
a second transformer, said second transformer comprising a first winding, a second winding, a third winding, a fourth winding, a fifth winding and a sixth winding that are connected in series the first winding of said second transformer having one end coupled to the second winding of said first transformer, the sixth winding of said second transformer having an opposite end coupled to one end of said third winding opposite to said second winding, the connection between the third winding and fourth winding of said second transformer being connected to ground potential;
a third switch, said third switch having one end coupled to the connection between the first winding and second winding of said second transformer and an opposite end providing a second voltage output (V2);
a fourth switch, said fourth switch having one end coupled to the connection between the second winding and third winding of said second transformer;
a fifth switch, said fifth switch having one end coupled to the connection between the fourth winding and fifth winding of said second transformer and an opposite end coupled to an opposite end of said fourth switch and providing a third voltage output (V3); and
a sixth switch, said sixth switch having one end coupled to the connection between the fifth winding and sixth winding of said second transformer and an opposite end connected to the second voltage output end of said third switch such that said second voltage output and said third voltage output are not affected by variation of said first voltage output.

2. The self-coupled transformer boostbuck circuit as claimed in claim 1, wherein said second transformer is a self-coupled transformer.

3. The self-coupled transformer boostbuck circuit as claimed in claim 1, wherein said first switch, said second switch, said third switch, said fourth switch, said fifth switch and said sixth switch each are one of a rectifier and a power switch, said power switch is one of a N-pass MOSFET (metal-oxide semiconductor field-effect) transistor, a N-pass junction field-effect transistor, a P-pass MOSFET transistor and a P-pass junction field-effect transistor.

4. The self-coupled transformer boostbuck circuit as claimed in claim 1, wherein the first winding of said first transformer has N1 number of turns and the second winding and third winding of said first transformer have N2 number of turns; the first winding and sixth winding of said second transformer have N5 number of turns and the second winding and fifth winding of said second transformer have N4 number of turns and the third winding and fourth winding of said second transformer have N3 number of turns.

5. The self-coupled transformer boostbuck circuit as claimed in claim 4, wherein said second voltage output.

$$(V2) = \frac{N3+N4}{N3+N4+N5} \times V1.$$

6. The self-coupled transformer boostbuck circuit as claimed in claim 4, wherein said third voltage output.

$$(V3) = \frac{N3}{N3+N4+N5} \times V1.$$

7. A self-coupled transformer boostbuck circuit used in a LLC converter, comprising:
a first transformer, said first transformer having a primary side and a secondary side, said primary side comprising a first winding, said secondary side comprising a second winding, a third winding, a fourth winding and a fifth winding, said second winding and said third winding and said fourth winding and said fifth winding being connected in series, said first winding having one end coupled to the output terminal of said LLC converter;
a second transformer, said second transformer comprising a first winding, a second winding, a third winding, a fourth winding, a fifth winding and a sixth winding, the first winding of said second transformer having one end coupled to the second winding of said first transformer, the sixth winding of said second transformer having one end coupled to an opposite end of the fifth winding of said first transformer, the connection between the third winding and fourth winding of said second transformer being connected to ground potential;
a first switch, said first switch having one end coupled to the first winding of said second transformer and an opposite end providing a first voltage output (V1);
a second switch, said second switch having one end coupled to one end of the second winding of said second transformer and the second winding of said first transformer and an opposite end providing a second voltage output (V2);
a third switch, said third switch having one end coupled to the connection between the second winding and third winding of said second transformer and an opposite end providing a third voltage output (V3);
a fourth switch, said fourth switch having one end coupled to the connection between the fourth winding and fifth winding of said second transformer and an opposite end connected to an opposite end of said third switch;
a fifth switch, said fifth switch having one end coupled to an opposite end of the fifth winding of said second transformer and the connection between the fourth winding and fifth winding of said first transformer and an opposite end coupled to an opposite end of said second switch; and
a sixth switch, said sixth switch having one end coupled to an opposite end of the sixth winding of said second transformer and an opposite end coupled to an opposite end of said first switch such that said second voltage output and said third voltage output are not affected by variation of said first voltage output.

8. The self-coupled boostbuck circuit as claimed in claim 7, wherein said second transformer is a self-coupled transformer.

9. The self-coupled transformer boostbuck circuit as claimed in claim 7, wherein said first switch, said second switch, said third switch, said fourth switch, said fifth switch and said sixth switch each are one of a rectifier and a power switch, said power switch is one of a N-pass MOSFET (metal-oxide semiconductor field-effect) transistor, a N-pass junction field-effect transistor, a P-pass MOSFET transistor and a P-pass junction field-effect transistor.

10. The self-coupled transformer boostbuck circuit as claimed in claim 7, wherein the first winding of said first transformer has N1 number of turns and the second winding and fifth winding of said first transformer have N2 number of turns and the third winding and fourth winding of said first transformer have N3 number of turns; the first winding and sixth winding of said second transformer have N4 number of turns and the second winding and fifth winding of said second transformer have N5 number of turns and the third winding and fourth winding of said second transformer have N6 number of turns.

11. The self-coupled transformer boostbuck circuit as claimed in claim 10, wherein said first voltage output.

$$(V1) = \left(\frac{N4}{N5+N6} + \frac{N2+N3}{N3}\right) \times V2.$$

12. The self-coupled transformer boostbuck circuit as claimed in claim 10, wherein said third voltage output.

$$(V3) = \frac{N6}{N5+N6} \times V2.$$

* * * * *